Figure 1:
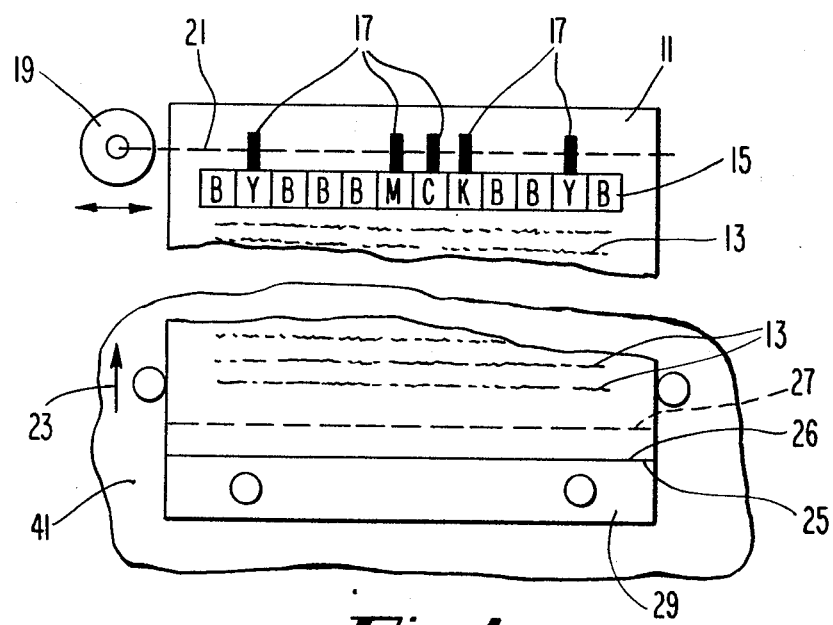

United States Patent [19]

Tobias

[11] 4,205,915
[45] Jun. 3, 1980

[54] SHEET POSITIONING MEANS

[76] Inventor: Philip E. Tobias, 1872 Watson Rd., Abington, Pa. 19001

[21] Appl. No.: 951,150

[22] Filed: Oct. 13, 1978

[51] Int. Cl.² ............................................. G01N 21/28
[52] U.S. Cl. .................................. 356/244; 248/206 A
[58] Field of Search ................... 356/244; 248/206 A, 248/467; 269/8; 271/DIG. 3; 350/DIG. 3

[56] References Cited
FOREIGN PATENT DOCUMENTS 1491470  6/1967  France ..................................... 248/467

Primary Examiner—John K. Corbin
Assistant Examiner—Bruce Y. Arnold
Attorney, Agent, or Firm—William E. Cleaver

[57] ABSTRACT

The present invention includes a holder bar which has two holes therein and into each of which is fitted a permanent magnet. Each permanent magnet is secured by a rod to a cap element and in between each cap element and the upper surface of the holder there is located a spring, to spring-load the associated magnet away from the bed upon which the holder is resting. The holder has a relatively straight edge and, in a preferred embodiment, has a stepped portion to form two substantially straight edges. A sheet of material such as a printed sheet is located on the bed in a particular position where it can be read by a scanner or cut or subjected to some interaction with a mechanism. The holder is brought in abutment with the sheet and the magnets are depressed to be magnetically secured to the bed and thus secure the holder. Thereafter, similar sheets can be readily aligned against the holder or guide. When the holder position needs to be changed, the magnets are disengaged magnetically and spring-loaded away from the bed so that the holder is easily moved to a new position.

4 Claims, 4 Drawing Figures

SHEET POSITIONING MEANS

BACKGROUND

To the best of my knowledge, there is no directly related prior art because the present sheet positioning device is principally used to locate printed copy under a scanning densitometer (not heretofore known by me) as described in my copending patent application, "Color Monitoring System For Use In Creating Colored Displays", Ser. No. 951,444 which was filed on Oct. 13, 1978. As will be described more in detail hereinafter, when material is printed in color, it is the custom for the printer to print a color swatch bar, that is, a line of different blocks of the colored ink being transferred to the paper, to make up the display or picture being printed. My scanning densitometer has a scanning head which is used to pass over the swatch bar, determine what colors are present in selected swatches or block and determine the optical densities of the colors in those selected swatches. As stated earlier, since a scanning densitometer has not heretofore been used, the need for a sheet positioning means to be used therewith may not have existed. However, there are devices which may be considered as prior art, although not invalidating prior art. For instance, milling machines very often have tables which permit guides or holders to be secured thereto and the same is true for power saw devices used to cut wood or metal. In each of the foregoing arrangements, the guides are secured to the tables or beds by passing bolts or rods through threaded or unthreaded holes in the beds. The present device, while taught as being used for aligning a sheet of paper to be read by a scanning head, could be used to align a piece of metal to be ground or a piece of wood to be cut by a power saw.

SUMMARY

In the present device, there is principally included a guide bar with two straight edges (although it need not have but one straight edge), one being stepped up and away from the other. The guide bar has two holes in it, one at either end of the bar. Into each hole there is fitted a permanent magnet. The bed upon which the guide rests should preferably be of a magnetizable material or should have a portion thereof which is fabricated from a magnetizable material. When the magnets are depressed, or pushed down, they come into contact with the magnetizable metal of the bed and are magnetically secured thereto. Hence the magnets act like two secure studs protruding from the base, or bed, into the guide, thus locking the guide into position. The magnets each have a pusher means or cap means secured thereto and each has a spring located between the underside of the cap means and the upper surface of the guide bar so that when the magnets are not magnetically engaged with the bed, they will be held away therefrom, thus permitting the user to readily move the guide bar to different locations on the bed.

Figure 2:
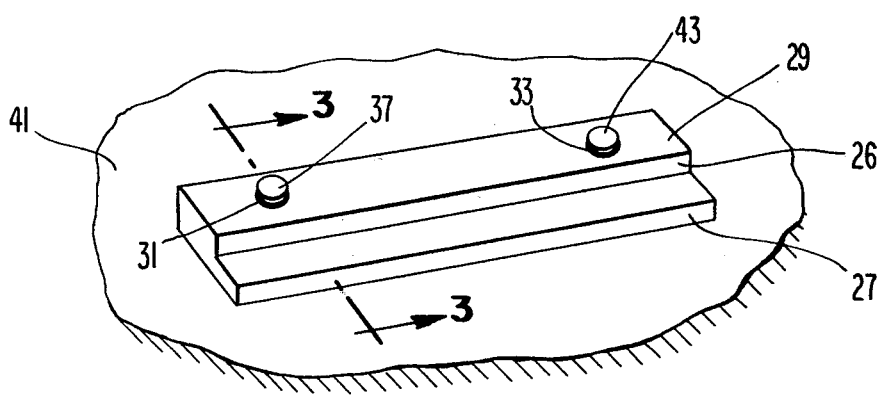
Figure 3A:
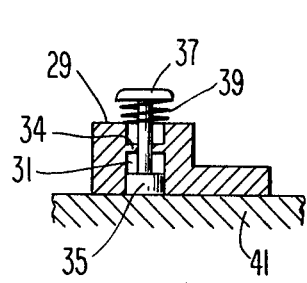
Figure 3B:
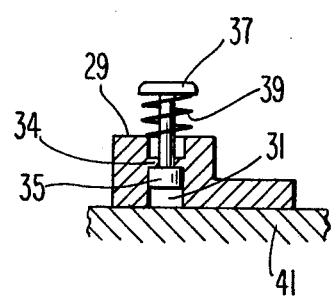

The objects and features of the present invention will be better understood from the following description taken in conjunction with the drawings wherein:

FIG. 1 shows the arrangement between the guide bar, the sheet to be positioned and a scanning head; and FIG. 2 is a pictorial of the guide bar; and FIG. 3A is a cross-section of FIG. 2 along line 3—3 with the magnet in a depressed position; and FIG. 3B is a cross-section of FIG. 2 along lines 3—3 showing the magnet in a released position.

Consider FIG. 1. In FIG. 1 there is shown a sheet of paper 11 upon which there is printed a commercial advertisement in the broken area 13. At the end of the sheet of paper 11 there is printed a swatch bar 15. The swatch bar 15 is shown as being made up of a number of blocks, some of which have the letter B therein, some with the letter Y and others respectively with M, C and K. The swatches with B therein are swatches with blended basic colors while the swatches: with Y show only yellow (a basic color); with M show only magenta (a basic color); with C show only cyan (a basic color); and with K shown only black (a basic color). As is more fully explained in my copending application, "Color Monitoring System For Use In Creating Colored Displays", the printer wants to be able to monitor the optical densities of the basic colors applied to the paper so that he can be certain that the advertisement 13 continues to be printed with consistent colors. The monitoring is accomplished, in part, in the invention of my copending application by having a scanning head pass over the swatches of the swatch bar 15 and provide signals to determine the optical densities thereof. However, the printer is primarily interested in monitoring the basic colors cyan, magenta, yellow and black. In my scanning densitometer system, black marks, such as marks are placed alongside of the swatches shown in FIG. 1 which are swatches of the basic colors. On a first scan, the head 19 travels over the black marks 17 to record where the marks are located, as measured from some reference point and therefore what swatches should be read. The means for accomplishing the recording of the marks is not described herein because it is not part of the present invention but such means are described in my copending application mentioned above.

After the head 19 has passed along the dashed line 21 and returned to its home position in the left of the drawing, the sheet 11 is moved in the direction of the arrow 23 until the edge 25 of the sheet 11 is in abutment with the edge 27 of the guide bar or holder 29. The edge 27 is shown by a dashed line in FIG. 1 but is better seen in FIG. 2. When the sheet 11 has been so moved, the swatch bar 15 will be located under the path of the head 19 (along dashed line 21). Since other copies from the printing batch will be monitored as the printing effort continues, it behooves the system to provide a "fixed" holder or guide bar 29 so that the other copies can be readily aligned under the scanning head.

In FIG. 2, there is shown a pictorial of the guide bar 29. Note that in the preferred embodiment the guide bar 29 has two alignment edges 26 and 27 which are formed to be substantially straight. In addition, as can be gleaned from FIG. 2, there are two apertures 31 and 33 formed in the guide bar. Note in FIG. 3A and FIG. 3B that the apertures (31) open completely through the guide bar.

From FIGS. 2, 3A and 3B it can be seen that there is located in each of the apertures a magnet, such as magnet 35 in aperture 31, and each magnet is secured to a cap means, such as cap means 37 secured to magnet 35. Located between the cap means 37 and the upper surface of the guide bar 29 there is located a spring 39. It should be understood that the arrangement of the magnet, cap and spring is the same for the aperture 33 side as has been described for the aperture 31 side. When the magnet 35 is spring loaded away from the bed 41, it abuts against the stop 34.

In the preferred embodiment, the guide bar 29 is located on a metal base or bed 41. When the magnet 35 is depressed to come into contact with the bed 41 it is magnetically attracted thereto and becomes magnetically locked to the base 41. When the caps 37 and 43 are pushed down the guide bar 29 is locked to the bed 41 by the two magnets. Accordingly the guide bar 29 is not movable when the magnets are depressed and the guide bar 29 provides a fixed means by which copies of the sheets can be repeatedly aligned.

The guide bar 29 is normally used as follows: The paper 11 is located so that the head 19 will pass over the swatch bar 15. As described in copending application entitled, "Scanning Track Alignment Device" Ser. No. 951,148 filed Oct. 13, 1978, the swatch bar 15 is positioned so that the head 19 passes over the swatch bar 15 by aligning two wires which are disposed one above the other. When the user sees the two wires as a single wire and the swatch bar is centered under the "single wire", then the track or path 21 will pass through the center of the swatch bar. Accordingly the head 19 will pass along the swatch bar to scan the undividual swatches. When paper 11 is so located, the guide bar 29 is set with the edge 27 in abutment with the edge 25. Without disturbing the paper 11 from its position just described, the caps 37 and 43 are depressed to hold the guide bar in place as described above. Thereafter, the paper is lifted from being in abutment with edge 27 and is pulled back so that the paper edge 25 is in abutment with guide bar edge 26 as shown in FIG. 1. When the paper edge 25 is in abutment with guide bar edge 26, the marks 17 lie along path 21 so that the head 19 can make a scan of the selection marks 17. Once the guide bar 29 has been so located it will be used repeatedly for the readings of other copies (such as paper 11) which represent an ongoing monitoring of the printing job. When the locations of the selection marks 17 have been recorded, the paper is moved forward to have the paper edge 25 to be in abutment with guide bar edge 27, thus aligning the swatch bar to be scanned.

As was mentioned earilier, in the preferred embodiment, the guide bar 29 is located in a metal bed 41, however it should be understood that the bed could be non-magnetizable material provided there were included a magnetizable section such as two strips of magnetizable metal disposed substantially orthogonally to the swatch bar 15 location. Such an arrangement permits the guide bar to be locked magnetically to the bed. Obviously other forms of magnetizable material could be secured to the bed to provide a basis for locking the guide bar.

The foregoing description has set out the use of the guide bar with aligning copies of paper to be scanned but it should be understood the present guide bar could be used to align work for a milling machine or a power saw and the like.

What I claim is:

1. A sheet positioning means to be used with a sheet of material that is movably disposed on a bed device wherein at least a portion of said bed device is magnetizable and wherein said positioning means is used for particularly locating said sheet of material relative to a mechanism which is going to be moved to effect an interaction with said sheet of material in relation to where said sheet has been particularly located comprising in combination: guide means formed to have a first substantially straight edge and further formed to have at least first and second apertures therein; first and second permanent magnet means respectively disposed in said first and second apertures; first and second spring retaining means respectively secured to said first and second magnet means; and first and second spring means formed and disposed to respectively fit between the underside of said first and second spring retaining means and the upper side of said guide means to respectively spring-load said first and second magnets whereby when said magnet means are depressed to come in contact with said magnetizale bed they become magnetically secured thereto, thus to secure said guide means in a fixed position so that said sheet of material abutting said first substantially straight edge is located in a first particular position and whereby when said magnet means are not magnetically secured to said bed device they are spring-loaded away from said bed, permitting said guide means to be easily moved to a new location.

2. A sheet positioning means according to claim 1 wherein said guide means is further formed to a step-like configuration, thus forming a second substantially straight edge which is disposed at a predetermined distance from said first substantially straight edge so that said sheet of material, when abutting said second substantially straight edge, is located in a second particular position.

3. A sheet positioning means according to claim 1 wherein said first and second spring retaining means are first and second cap means respectively secured to said first and second magnet means.

4. A sheet positioning means according to claim 2 wherein said predetermined distance between said first substantially straight edge and said second substantially straight edge is equal to the distance between a first and second scanning path so that said sheet of material can be readily located to enable said first and second scanning paths to be observed by a scanning head passing thereover.

* * * * *